United States Patent
Li et al.

(10) Patent No.: US 9,667,095 B2
(45) Date of Patent: May 30, 2017

(54) ELECTRONIC APPARATUS

(71) Applicants: Shu-Hao Li, Taipei (TW); Kuo-Chan Huang, Taipei (TW); Yi-Hsun Lin, Taipei (TW); Tzu-Chiang Mi, Taipei (TW)

(72) Inventors: Shu-Hao Li, Taipei (TW); Kuo-Chan Huang, Taipei (TW); Yi-Hsun Lin, Taipei (TW); Tzu-Chiang Mi, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 580 days.

(21) Appl. No.: 14/182,288

(22) Filed: Feb. 18, 2014

(65) Prior Publication Data

US 2014/0232205 A1    Aug. 21, 2014

Related U.S. Application Data (60) Provisional application No. 61/766,092, filed on Feb. 18, 2013.

(51) Int. Cl.
*H01H 47/00* (2006.01)
*H02J 9/00* (2006.01)
*G06F 1/32* (2006.01)

(52) U.S. Cl.
CPC ............ *H02J 9/005* (2013.01); *G06F 1/3206* (2013.01); *G06F 1/3234* (2013.01); *Y10T 307/826* (2015.04)

(58) Field of Classification Search
CPC ...... H02J 9/005; G06F 1/3234; G06F 1/3206; Y10T 307/826

USPC ......................................................... 307/125
See application file for complete search history.

(56) References Cited

U.S. PATENT DOCUMENTS

| | | | |
|---|---|---|---|
| 2005/0168189 A1 | 8/2005 | Schweigert | |
| 2009/0206792 A1* | 8/2009 | Hyatt | H02J 7/0032 320/114 |
| 2012/0293017 A1* | 11/2012 | Lidsky | H02H 3/087 307/126 |
| 2014/0175885 A1* | 6/2014 | Shih | H02M 1/36 307/31 |

FOREIGN PATENT DOCUMENTS

| | | |
|---|---|---|
| TW | 200826409 | 6/2008 |
| TW | 201118552 | 6/2011 |

OTHER PUBLICATIONS

"Office Action of Taiwan Counterpart Application", issued on Mar. 24, 2015, p. 1-p. 10.

* cited by examiner

*Primary Examiner* — Jared Fureman
*Assistant Examiner* — Duc M Pham
(74) *Attorney, Agent, or Firm* — Jianq Chyun IP Office (57) ABSTRACT

An electronic apparatus is provided. The electronic apparatus includes a controller, a first trigger circuit, a switch unit and a logic circuit. The controller provides a setting signal. The first trigger circuit provides a trigger signal according to at least one of first trigger situations. The switch unit is connected to a power input terminal. The logic circuit adjusts a switching signal according to the setting signal and the trigger signal. The switch unit decides whether to provide an input voltage at the power input terminal to the electronic apparatus according to the switching signal.

18 Claims, 6 Drawing Sheets

ELECTRONIC APPARATUS

CROSS-REFERENCE TO RELATED APPLICATION

This application claims the priority benefits of U.S. provisional application Ser. No. 61/766,092, filed on Feb. 18, 2013. The entirety of the above-mentioned patent application is hereby incorporated by reference herein and made a part of this specification.

BACKGROUND

Technical Field

The invention relates to a power control technique. Particularly, the invention relates to an electronic apparatus having a power saving effect.

Related Art

As the issue of global warming is gradually taken seriously, awareness of environmental protection gradually rises, and consumer electronic apparatuses related to power consumption (for example, desktop computers, notebooks, mobile phones, digital cameras, and tablet personal computers, etc.) all take power saving as an important target, and are designed towards a trend of achieving maximum performance with limited power.

A general consumer electronic apparatus generally has an embedded controller (EC) to execute power management of the electronic apparatus. In computer technology domain, the EC can also be implemented by a keyboard controller. The EC can be connected to various components in the electronic apparatus, and the EC performs operations by using an alternating current (AC) power or a low voltage auxiliary power generated by a direct current (DC) power received from a battery. The EC also monitors an operation/power consumption state of each component in the electronic apparatus, and accordingly adjusts the power required by each of the components to achieve an effect of controlling power consumption.

However, since the EC is in charge of power management in the electronic apparatus, it is required to immediate react in response to the state of the electronic apparatus, and the EC has to be kept activating permanently in design. In other words, even if the electronic apparatus has entered a power saving state (for example, a standby mode or a shutdown state), the EC still operates based on an auxiliary power to continually consume power, so that the power of EC cannot be saved.

SUMMARY

The invention is directed to an electronic apparatus. When the electronic apparatus enters a power saving state (for example, a standby mode or a shutdown state), a passive logic circuit is used to replace an embedded controller (EC), and a state of the electronic apparatus is dynamically monitored according to a predefined trigger situation, such that the EC can also enter the standby mode or can be turned off to reduce power consumption. When the aforementioned trigger situation is occurred, the logic circuit immediately activates the EC to implement subsequent processing of the power management, so as to achieve a power saving effect.

The invention provides an electronic apparatus including a controller, a first trigger circuit, a switch unit and a logic circuit. The controller provides a setting signal. The first trigger circuit provides a trigger signal according to at least one first trigger situation. The switch unit is connected to a power input terminal of the electronic apparatus. The logic circuit adjusts a switching signal according to the setting signal and the trigger signal. The switch unit decides whether to provide an input voltage at the power input terminal to the electronic apparatus according to the switching signal.

In an embodiment of the invention, when the electronic apparatus enters a power saving state, the controller enables the setting signal, the logic circuit enables the switching signal according to the setting signal, and the switch unit stops providing the input voltage to the electronic apparatus according to the enabled switching signal.

In an embodiment of the invention, the power saving state includes a state of system hibernation or shutdown in case that the power input terminal receives the input voltage, a state that a battery installed in the electronic apparatus is fully charged or the electronic apparatus doe not have the battery, and a state that all functions related to the system hibernation or shutdown are disabled.

In an embodiment of the invention, when the at least one first trigger situation is occurred, the first trigger circuit enables the trigger signal, the logic circuit disables the switching signal according to the trigger signal, and the switch unit provides the input voltage to the electronic apparatus according to the disabled switching signal.

In an embodiment of the invention, the at least one first trigger situation includes a situation that a battery is reinstalled to the electronic apparatus, a situation that the electronic apparatus is activated, or a situation that the electronic apparatus re-receives the input voltage.

In an embodiment of the invention, when the logic circuit does not receive the enabled setting signal or the enabled trigger signal, the logic circuit makes the switch unit to maintain an original state.

In an embodiment of the invention, the first trigger circuit includes a one shot circuit. The one shot circuit is coupled to the logic circuit, and provides the enabled trigger signal to the logic circuit when the at least one first trigger situation is occurred.

In an embodiment of the invention, the logic circuit includes a first NOR gate and a second NOR gate. A first input terminal of the first NOR gate is coupled to the setting signal, and a second input terminal of the first NOR gate is coupled to the switching signal. A first input terminal of the second NOR gate is coupled to the trigger signal, a second input terminal of the second NOR gate is coupled to an output terminal of the first NOR gate, and an output terminal of the second NOR gate provides the switching signal.

In an embodiment of the invention, the electronic apparatus further includes a power conversion circuit. The power conversion circuit is coupled to the switch unit and the controller, and the power conversion circuit converts the input voltage into a driving voltage to drive the controller.

In an embodiment of the invention, the power conversion circuit is further coupled to the power input terminal and the logic circuit to convert the input voltage into an auxiliary voltage to drive the logic circuit.

In an embodiment of the invention, the switch unit includes a back-to-back switch, and the electronic apparatus further includes an adjustment circuit. The adjustment circuit is coupled between the switch unit and the logic circuit, and adjusts a level of the switch signal according to a type of the switch unit for outputting to the switch unit.

In an embodiment of the invention, the switch unit is a set of N-type field effect transistors with sources coupled to each other.

In an embodiment of the invention, the adjustment circuit is further coupled to the auxiliary voltage to adjust a level of the switching signal for outputting to the switch unit.

In an embodiment of the invention, the electronic apparatus further includes a switch. A first terminal of the switch is coupled to the auxiliary voltage, a second terminal of the switch is coupled to the controller, and a control terminal of the switch is coupled to the switching signal.

In an embodiment of the invention, the power saving state further includes a state when a capacity of the battery is greater than a high threshold, and when the capacity of the battery is smaller than a low threshold, the controller controls the logic circuit to turn on the switch unit, and the switch unit provides the input voltage to the electronic apparatus.

In an embodiment of the invention, the electronic apparatus further includes a virtual load and a second trigger circuit. The virtual load is coupled to the power input terminal. The second trigger circuit is coupled to the virtual load, and when at least one second trigger situation of the electronic apparatus is occurred, the second trigger circuit activates the virtual load to adjust an output power output to the electronic apparatus by a power supply device coupled to the electronic apparatus.

In an embodiment of the invention, the second trigger situation includes a situation that a battery is reinstalled to the electronic apparatus, or a situation that the electronic apparatus is activated.

In an embodiment of the invention, the electronic apparatus further includes a power detector. The power detector is coupled to the power input terminal and the first trigger circuit, and when the power detector detects that the input voltage is received, the first trigger circuit outputs the trigger signal to turn on the switch unit.

According to the above descriptions, when the electronic apparatus of the invention enters the power saving state (for example, the standby mode or the shutdown state), the embedded controller is capable of turning off the switch unit used for controlling the power input through the passive logic circuit, such that the DC power is stopped to be supplied to the electronic apparatus and the embedded controller itself. At the time, the logic circuit dynamically monitors the state of the electronic apparatus through the predefined trigger situation. When the aforementioned trigger situation is occurred, the logic circuit immediately activates the embedded controller to implement subsequent processing of power management. In this way, in case that the controller of the electronic apparatus enters the standby state or the controller is turned off, the logic circuit replaces the controller to monitor the state of the electronic apparatus, so as to decrease power consumption of the controller under the standby mode. In other words, the logic circuit operates based on the auxiliary circuit, and the logic circuit replaces the controller under the standby mode or the shutdown state. Moreover, when the state of the electronic apparatus is changed, the logic circuit can immediately turn on the switch unit to restore supplying power to the electronic apparatus and activate the controller, such that the controller accordingly executes the required power management function. In this way, under a premise that the functions of the electronic apparatus are not influenced, effects of power saving and green power of the electronic apparatus are achieved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In order to avoid unnecessary power consumption of electronic apparatus, the embodiment of the invention provides an electronic apparatus. When the electronic apparatus enters a power saving state (for example, a standby mode or a shutdown state), a controller controls a switch unit used for controlling power input to stop supplying power to the electronic apparatus after executing a general power saving process, and a logic circuit replaces the controller to dynamically monitor a state of the electronic apparatus according to a predefined trigger situation. When the aforementioned trigger situation is occurred, the logic circuit immediately activates the embedded controller to implement subsequent processing of power management, such that the controller also enters the standby mode or is turned off to decrease power consumption. Moreover, when the state of the electronic apparatus or the predefined trigger situation is changed, the logic circuit can immediately activate the controller to perform corresponding operations. In this way, unnecessary power consumption of the controller is decreased to achieve a green power effect.

Reference will now be made in detail to the present preferred embodiments of the invention, examples of which are illustrated in the accompanying drawings. Wherever possible, the same reference numbers are used in the drawings and the description to refer to the same or like parts.

Figure 1:
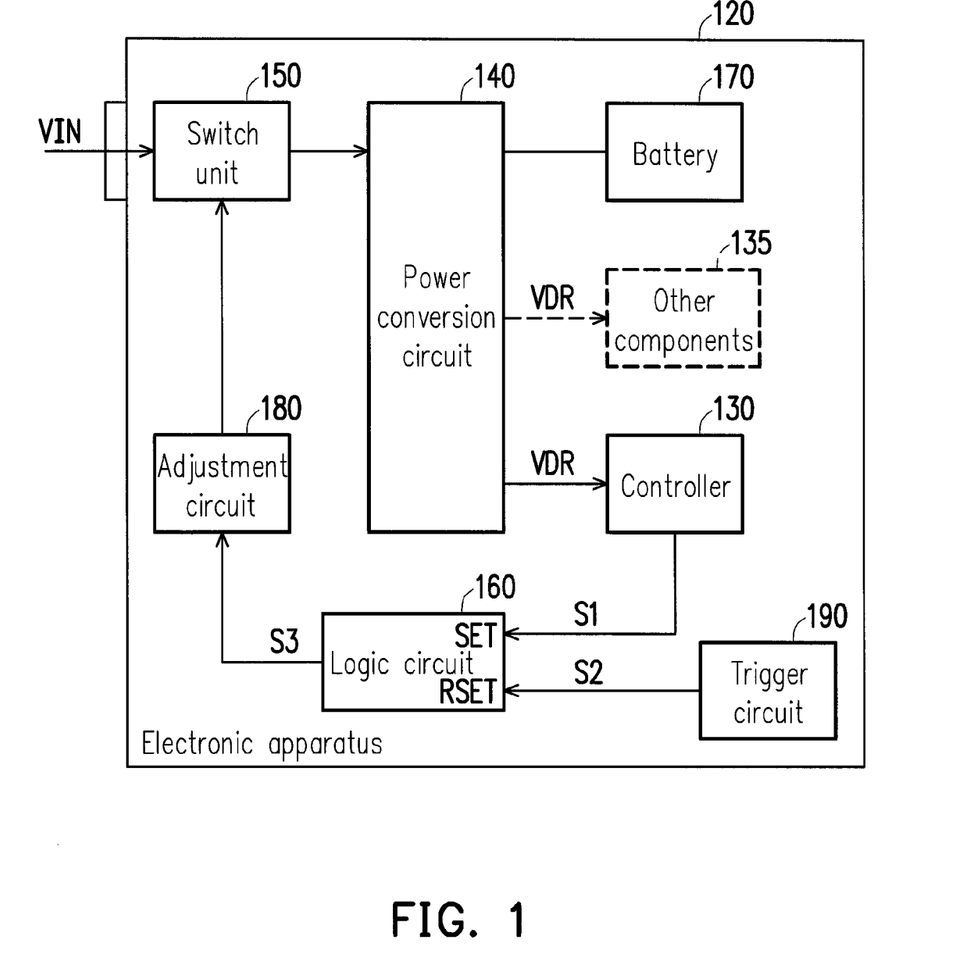
FIG. 1 is a block diagram of an electronic apparatus according to an embodiment of the invention.

FIG. 1 is a block diagram of an electronic apparatus 120 according to an embodiment of the invention. Referring to FIG. 1, the electronic apparatus 120 includes a controller 130, a power conversion circuit 140, a switch unit 150, a logic circuit 160, a battery 170, an adjustment circuit 180 and a trigger circuit 190.

In FIG. 1, the controller 130 is, for example, an embedded controller (EC) or a keyboard controller (KBC). The controller 130 outputs a setting signal S1 (For example, a pulse signal) to the logic circuit 160. The power conversion circuit 140 is coupled to the controller 130, the switch unit 150 and the battery 170. The power conversion circuit 140 converts an input voltage VIN transmitted through the switch unit 150 into at least one driving voltage VDR (for example, 3Valw and/or 5Valw), so as to provide power required by the controller 130 and other components 135 (shown by dot lines) of the electronic apparatus 120 for normal operations. The other components 135 are, for example, a central processor, a graphics processor, etc. that require a power supply in the electronic apparatus. Moreover, the power conversion circuit 140 can also convert the input voltage VIN provided from external or a DC power provided by the battery into an auxiliary voltage, and supplies power to the controller 130 and the logic circuit 160 through the auxiliary voltage.

The switch unit 150 receives the input voltage VIN (for example, 19V) through the power input terminal of the electronic apparatus 120, and is turned on or turned off in response to a switching signal S3 provided by the logic circuit 160. In the present embodiment, the switch unit 150 is, for example, a set of N-type field effect transistors with sources coupled to each other, though the invention is not limited thereto. In other embodiments of the invention, the switch unit 150 can also be a set of P-type field effect transistors with sources coupled to each other, which may achieve the same function in collaboration with the adjustment circuit 180. The adjustment circuit 180 is coupled between the switch unit 150 and the logic circuit 160. The adjustment circuit 180 adjusts a level of the switching signal S3 output by the logic circuit 160 according to the type of the switch unit 150, i.e. performs logic change or level shift on the switching signal S3, so as to correctly control the switch unit 150. In the present embodiment, the adjustment circuit 180 is, for example, a level shift inverter and a corresponding switch circuit, though the circuit structure of the adjustment circuit 180 is not limited thereto. The logic circuit 160 is coupled to the controller 130, the adjustment circuit 180 and the trigger circuit 190, and the logic circuit 160 generates the switching signal S3 to control the switch unit 150 according to the setting signal S1 output by the controller 130 and a trigger signal S2 output by the trigger circuit 190 (for example, producing a pulse surge of logic 1). The trigger circuit 190 is, for example, a one shot circuit. The trigger circuit 190 may include an OR gate or a corresponding logic gate. The trigger circuit 190 generates the trigger signal S2 according to at least one trigger situation occurred in the electronic apparatus 120. In the present embodiment, the predetermined trigger situation may includes a situation that the battery 170 is reinstalled to the electronic apparatus 120, a situation that the electronic apparatus is activated (for example, a power button is pressed), and a situation that the electronic apparatus 120 re-receives the input voltage VIN (for example, a power input terminal is plugged to the power input terminal of the electronic apparatus 120), though the invention is not limited thereto, and the aforementioned trigger situations can be adjusted according to an actual requirement.

Figure 2:
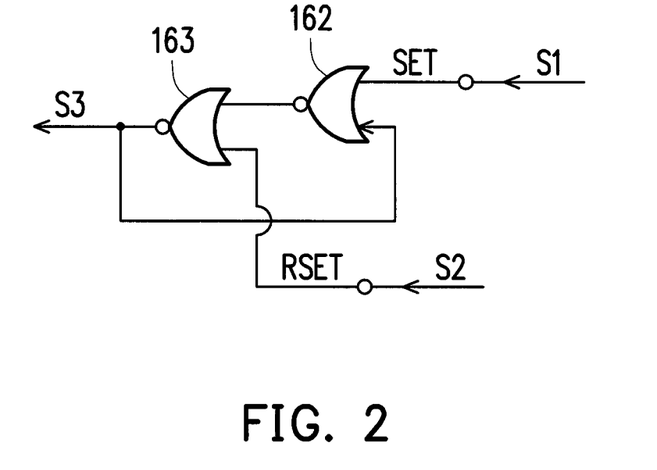
FIG. 2 is a schematic diagram of a logic circuit according to an embodiment of the invention.

The embodiment of the invention provides a plurality of implementations of the logic circuit 160, which are described in detail with reference of FIG. 2. FIG. 2 is a schematic diagram of the logic circuit 160 according to an embodiment of the invention. Referring to FIG. 2, the logic circuit 160 include a NOR gate 162 and a NOR gate 163. As shown in FIG. 2, an input terminal of the NOR gate 162 is a set pin SET of the logic circuit 160, and is coupled to the setting signal S1. Another input terminal of the NOR gate 162 is coupled to an output terminal of the NOR gate 163. An input terminal of the NOR gage 163 is a reset pin REST of the logic circuit 160, and is coupled to the trigger signal S2. Another input terminal of the NOR gate 163 is coupled to an output terminal of the NOR gate 162. The output terminal of the NOR gate 163 provides the switching signal S3.

TABLE 1

| Reset pin REST | Set pin SET | Switch unit 150 |
| --- | --- | --- |
| Disable (logic 0) | Disable (logic 0) | State unchanged |
| Disable (logic 0) | Enable (logic 1) | Turn off |
| Enable (logic 1) | Disable (logic 0) | Turn on |

The table (1) is a truth table that describes operations of the logic circuit 120 and the switch unit 150. In other embodiments of the invention, as long as the circuit configuration of the logic circuit 160 achieves the function of the above truth table, the logic circuit 160 of the present embodiment is implemented. Operations of various components in FIG. 1 and FIG. 2 are described below with reference of the table (1).

Referring to FIG. 1, FIG. 2 and the table (1), during a normal operation, if none of the setting signal S1 of the controller 130 and the trigger signal S2 of the trigger circuit 190 generates a pulse, it represents that the setting signal S1 and the trigger signal S2 are all disabled (logic 0), and a voltage at the output terminal of the NOR gate 163 is maintained to a previous state. In other words, when the setting signal S1 and the trigger signal S2 are all disabled, the state of the switch unit 150 is not changed. When the electronic apparatus 120 enters the power saving state, the controller 130 enables the setting signal S1 to produce a trigger surge of logic 1 after executing a general power saving procedure. Meanwhile, the trigger signal S2 is still disabled (logic 0). The input terminal (for example, the set pin SET of the logic circuit 160) of the NOR gate 162 receives the setting signal S1 (logic 1) enabled by the controller 130, and the input terminal (for example, the reset pin REST of the logic circuit 160) of the NOR gate 163 is disabled (logic 0), and the logic circuit 160 outputs the enabled (logic 1) switching signal S3 after computation. The switching signal S3 is processed by the adjustment circuit 180 (for example, the level shift inverter), and is adjusted into a disable signal to turn off the switch unit 150, such that the external power stops providing the input voltage VIN. In this way, the electronic apparatus 120 can turn off the controller 130 to decrease power consumption.

In the present embodiment, the power saving state of the electronic apparatus 120 is defined to include following three states in the controller 130: (1) a state 4 (hibernation) or a state S5 (shutdown) defined when the system of the electronic apparatus 120 enters an advanced configuration and power interface (ACPI) in case that the power input terminal of the electronic apparatus 120 receives the input voltage VIN; (2) a state that the battery 170 installed in the electronic apparatus 120 is fully charged or the electronic apparatus 120 doe not have the battery 170; and (3) a state that all functions (for example, wake on LAN, USB charging, etc.) related to the state S4 or the state S5 of the electronic apparatus 120 are disabled. However, the power saving state of the electronic apparatus 120 may have other patterns, and the embodiment of the invention is not limited to the aforementioned descriptions, and the power saving state can be defined and adjusted according to an actual requirement.

On the other hand, when the trigger circuit 190 detects that a specific trigger situation is occurred in the electronic apparatus 120, the trigger circuit 190 enables the trigger signal S2 to produce the trigger surge of logic 1. Now, the setting signal S1 is still disabled (logic 0). The input terminal (for example, the reset pin REST of the logic circuit 160) of the NOR gate 163 receives the trigger signal S2 (logic 1)

enabled by the trigger circuit 190, and the input terminal (for example, the set pin SET of the logic circuit 160) of the NOR gate 162 is disabled (logic 0), and the logic circuit 160 outputs the disabled (logic 0) switching signal S3 after computation. The switching signal S3 is processed by the adjustment circuit 180 (for example, the level shift inverter), and is adjusted into an enable signal to turn on the switch unit 150 (for example, implemented by the N-type field effect transistors) for providing the input voltage VIN, such that the input voltage VIN is transmitted to the power conversion circuit 140. In this way, the input voltage VIN is converted into a driving voltage VDR through the power conversion circuit 140, the controller 130 is accordingly activated, and the controller 130 can perform various corresponding power management procedures or related subsequent processing in response to the specific trigger situation. In the present embodiment, a situation of simultaneously receiving the enabled setting signal S1 (logic 1) and the enabled trigger signal S2 (logic 1) does not exist, so that such situation is not listed in the table (1).

It should be noticed that in an embodiment of the invention, the power saving state further includes a state when a capacity of the battery 170 is greater than a high threshold. On the other hand, the controller 130 can be connected to a counter (not shown), such that the controller 130 can be automatically activated and detect the state of the battery 170 after being turned off or entering the hibernation state for a period of time. When the controller 130 detects that the capacity of the battery 170 is smaller than a low threshold, the controller 130 controls the logic circuit 160 to turn on the switch unit 150, and the switch unit 150 provides the input voltage VIN to the electronic apparatus 120, so as to avoid excessive discharging of the battery 170 to influence battery service life.

Figure 3:
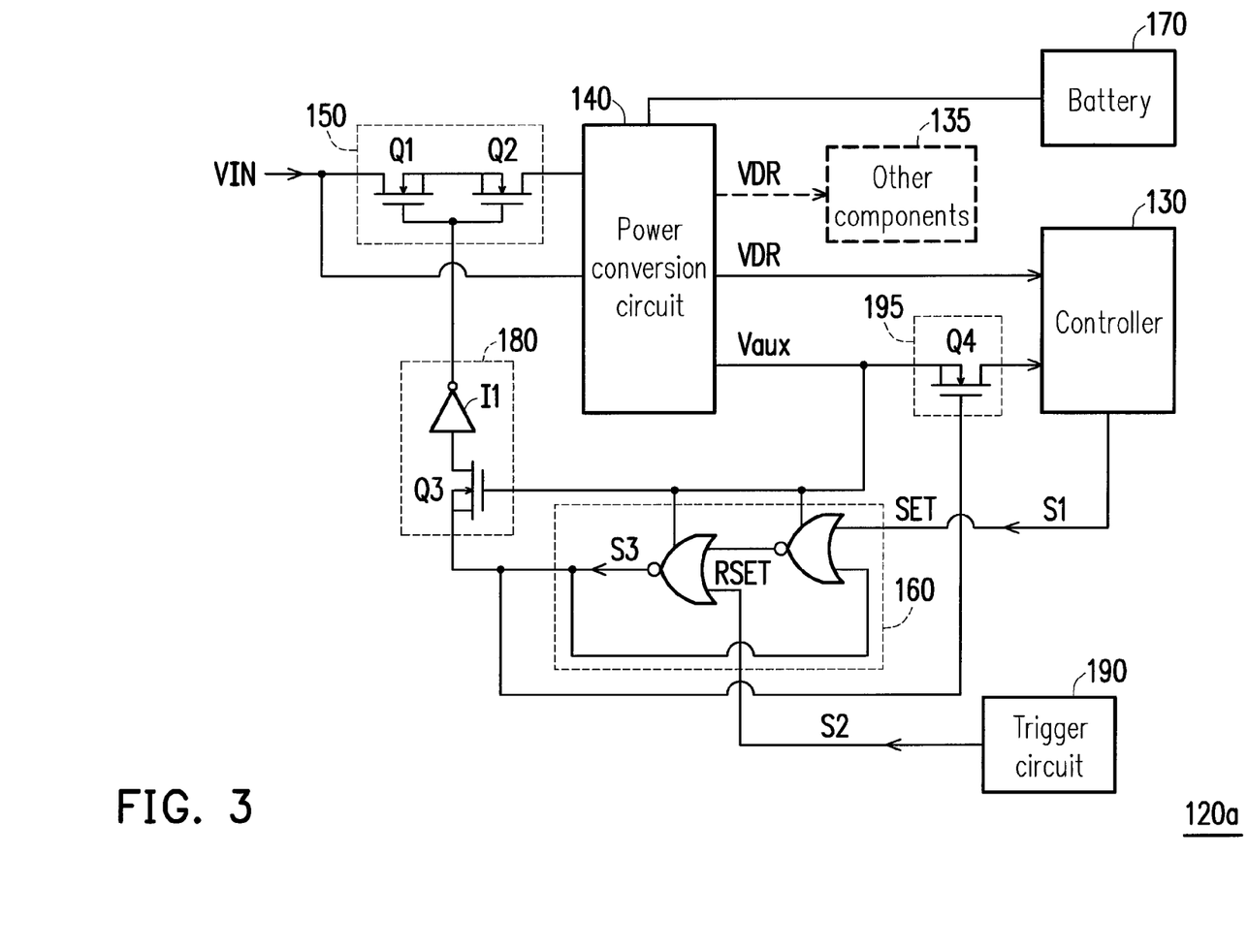
FIG. 3 is a schematic diagram of an electronic apparatus according to an embodiment of the invention.

Another embodiment is provided below to describe the spirit of the invention. FIG. 3 is a schematic diagram of an electronic apparatus 120a according to an embodiment of the invention. Referring to FIG. 3, the electronic apparatus 120a includes the controller 130, the power conversion circuit 140, the switch unit 150, the logic circuit 160, the battery 170, the adjustment circuit 180, the trigger circuit 190 and a switch 195.

In the present embodiment of the invention, the switch unit 150 includes a set of N-type field effect transistors Q1, Q2 with sources coupled to each other. The adjustment circuit 180 includes a level shift inverter I1 and an N-type field effect transistor Q3. A control terminal of the transistor Q3 is connected to an auxiliary voltage Vaux, and when the auxiliary voltage Vaux is enabled, the transistor Q3 is turned on. The switch 195 includes an N-type field effect transistor Q4, though the invention is not limited thereto. A part of components and operations of the present embodiment have been described in the aforementioned embodiment, and details of the same parts are not repeated.

A difference between the present embodiment and the aforementioned embodiment is that in FIG. 3, the switch 195 is connected between the power conversion circuit 140 and the controller 130. The switch 195 is turned on or turned off according to the switching signal S3. Besides that the power conversion circuit 140 receives the input voltage VIN through the switch unit 150, the power conversion circuit 140 is also directly coupled to the input voltage VIN, and converts the input voltage VIN into an auxiliary voltage Vaux (for example, +3V) and transmits the same to the controller 130 and the NOR gate 162 and the NOR gate 163 of the logic circuit 160.

Referring to FIG. 3, in the present embodiment, when the electronic apparatus 120a enters the power saving state, the controller 130 cannot be totally turned off since it is required to execute a function of remote control, etc., so that the controller 130 can only enter the standby mode to decrease power consumption. Now, the logic circuit 160 enables the switching signal S3, and the switch unit 150 stops providing the input voltage VIN according to the enabled switching signal S3. Comparatively, the switch 195 provides the auxiliary voltage Vaux to the controller 130 according to the enabled switching signal S3 to maintain a power required by the electronic apparatus under the standby mode. Moreover, the power conversion circuit 140 also provides the auxiliary voltage Vaux to the NOR gate 162 and the NOR gate 163 of the logic circuit 160, such that the NOR gate 162 and the NOR gate 163 can still normally operate under the power saving state of the electronic apparatus 120a. On the other hand, when the trigger circuit 190 detects that the specific situation is occurred in the electronic apparatus 120, the logic circuit 160 disables the switching signal S3, and the switch unit 150 provides the input voltage VIN to the electronic apparatus 120a according to the disabled switching signal S3. Comparatively, the switch 195 stops providing the auxiliary voltage Vaux to the controller 130 according to the disabled switching signal S3. Therefore, the controller 130 receives the driving voltage VDR converted from the input voltage VIN and is activated, and the controller 130 performs various corresponding operations in response to the specific trigger situation.

Figure 4:
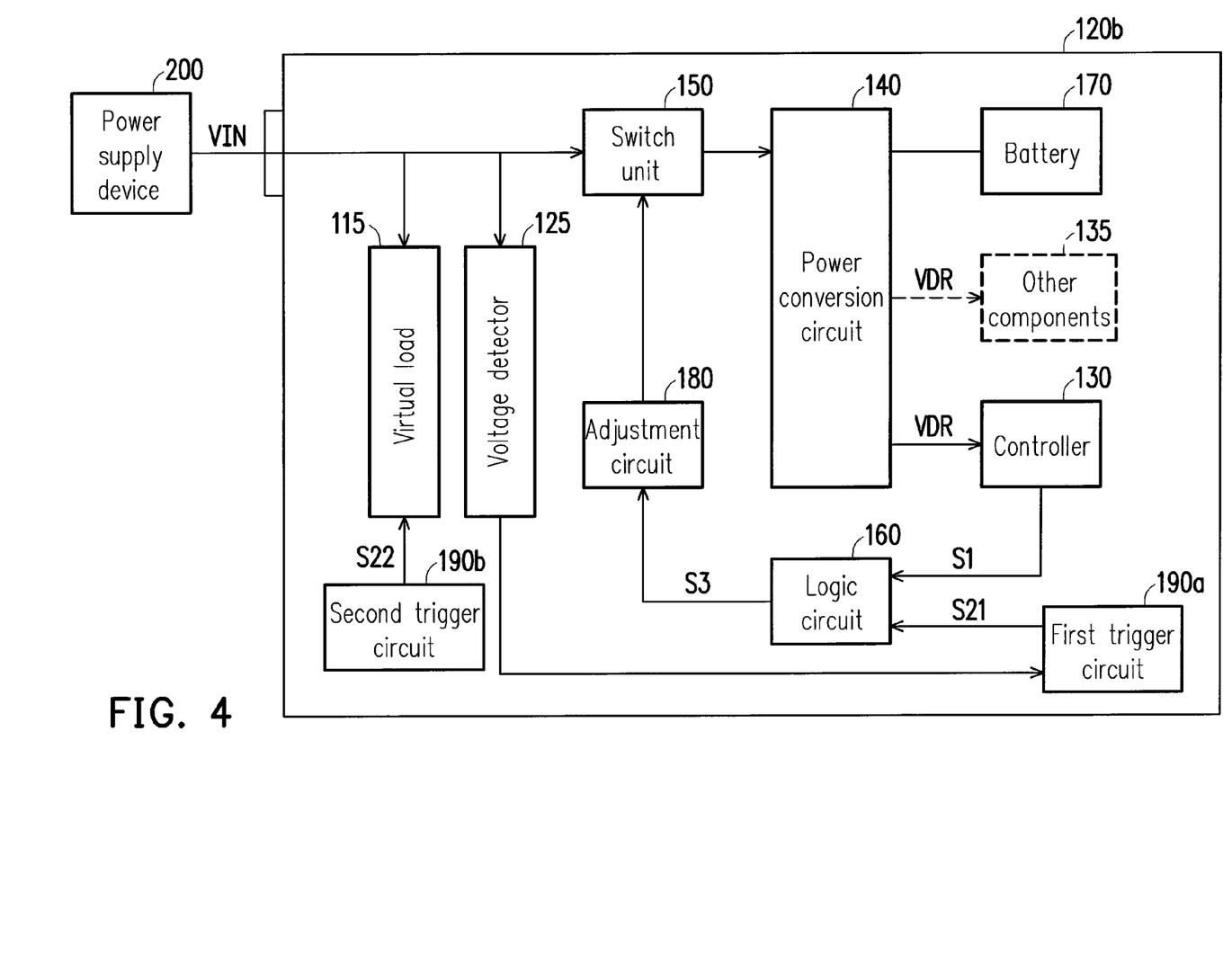
FIG. 4 is a block diagram of a power supply system according to an embodiment of the invention.

It should be noticed that in the invention, a power supply device having a function of dynamically adjusting an output voltage can be used to achieve the power saving function. Another embodiment is provided below for detail descriptions. FIG. 4 is a block diagram of a power supply system 100 according to an embodiment of the invention. Referring to FIG. 4, the power supply system 100 includes a power supply device 200 and an electronic apparatus 120b. In FIG. 4, the electronic apparatus 120b includes the controller 130, the power conversion circuit 140, the switch unit 150, the logic circuit 160, the battery 170, the adjustment circuit 180, a first trigger circuit 190a, a second trigger circuit 190b, a virtual load 115 and a voltage detector 125. A part of components and operations of the present embodiment have been described in the aforementioned embodiment, and details of the same parts are not repeated.

A difference between the present embodiment and the aforementioned embodiment is that the electronic apparatus 120b includes the virtual load 115, the voltage detector 125, the first trigger circuit 190a and the second trigger circuit 190b. The voltage detector 125 is coupled to the power input terminal of the electronic apparatus 120b and the first trigger circuit 190a. The virtual load 115 is coupled to the power input terminal of the electronic apparatus 120b and the second trigger circuit 190b. The virtual load 115 can be implemented by physical circuit components, for example, implemented by a circuit structure composed of a resistor, a capacitor, an inductor and/or a transistor. The virtual load 115 receives the input voltage VIN, and adjusts a power value of the input voltage VIN. The voltage detector 125 detects whether the electronic apparatus 120b receives the input voltage VIN, and accordingly controls the first trigger circuit 190a to enable a trigger signal S21 for transmitting to the reset pin REST of the logic circuit 160. The second trigger circuit 190b activates the virtual load 115 according to the state of the electronic apparatus 120b, so as to adjust the power value of the input voltage VIN.

Figure 5:
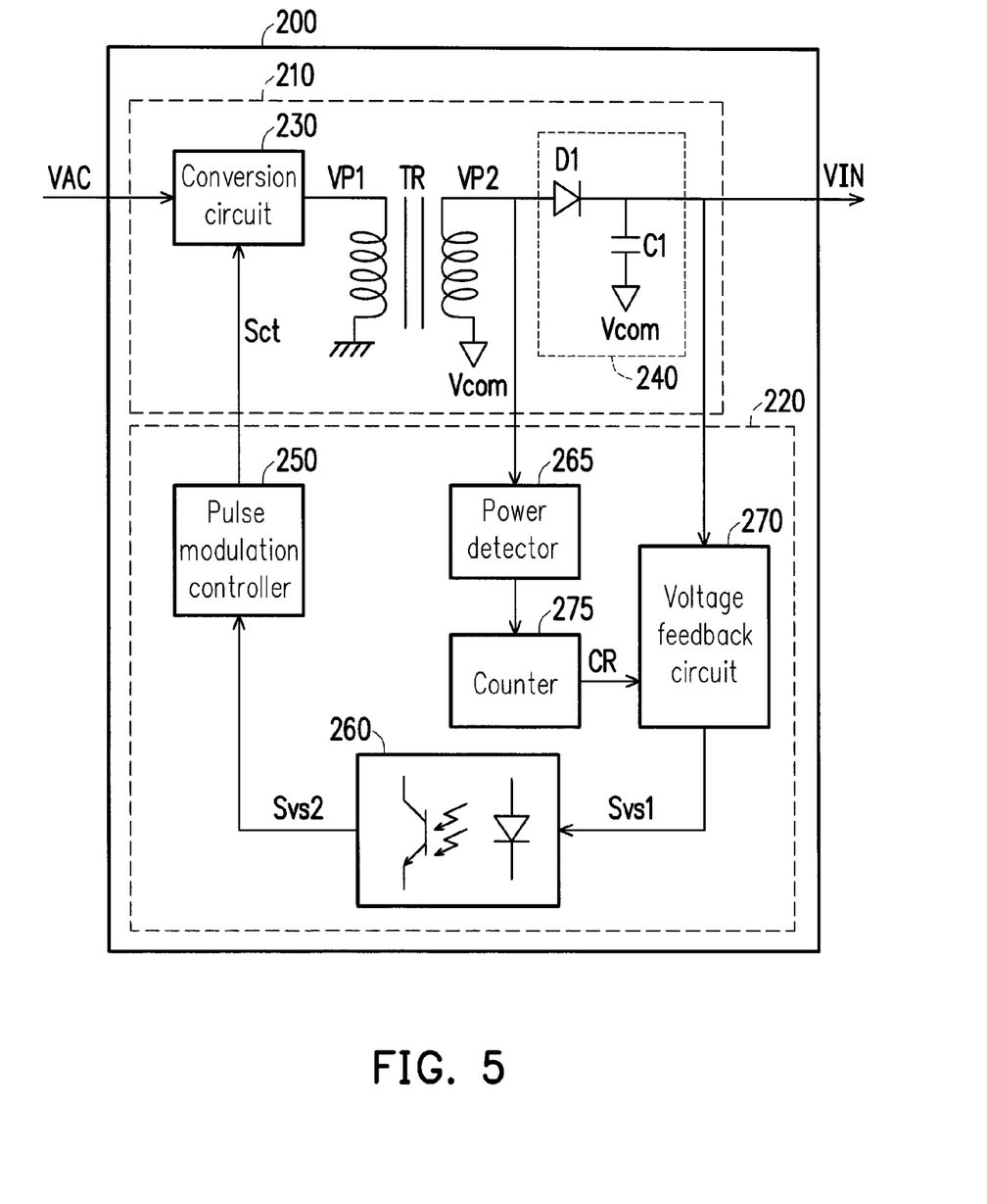
FIG. 5 is a schematic diagram of a power supply device according to an embodiment of the invention.

Internal structure of the power supply device 200 is described below. FIG. 5 is a schematic diagram of a power supply device 200 according to an embodiment of the invention. Referring to FIG. 5, the power supply deice 200 includes an alternating current (AC) to direct current (DC) converter 210 and a power conversion control unit 220. The AC to DC converter 210 receives an AC voltage VAC and a control signal Set. The AC to DC converter 210 converts the AC voltage VAC into the DC input voltage VIN for providing to the electronic apparatus 120b according to the control signal Set. The power conversion control unit 220 is coupled to the AC to DC converter 210, and detects a power of the input voltage VIN to determine a state of the electronic apparatus 120b.

In FIG. 5, the AC to DC converter 210 includes a conversion circuit 230, a transformer TR and a rectifier circuit 240. The conversion circuit 230 receives the AC voltage VAC and a common mode voltage Vcom, and converts the AC voltage AVC into a first power voltage VP 1 according to the control signal Sct. The transformer TR converts the first power voltage VP1 into a second power voltage VP2. The rectifier circuit 240 converts the second power voltage VP2 into the input voltage VIN. The rectifier circuit 240 is, for example, composed of a diode D1 and a capacitor C1, though the invention is not limited thereto.

In FIG. 5, the power conversion control unit 220 includes a pulse modulation controller 250, an optical coupling circuit 260, a power detector 265, a voltage feedback circuit 270 and a counter 275. The power detector 265 detects a power PW of the input voltage VIN, where the power PW of the input voltage VIN relates to a power of the second power voltage VP2. Therefore, in the present embodiment, the power PW of the input voltage VIN can be determined by detecting the power value of the second power voltage VP2, though the invention is not limited thereto. The counter 275 is controlled by the power detector 265 to count a predetermined time period, for example, when the power PW of the input voltage VIN is within a predetermined range, the power detector 265 controls the counter 275 to count the predetermined period.

The voltage feedback circuit 270 detects a voltage level of the input voltage VIN, and outputs a voltage setting signal Svs1 according to the voltage level of the input voltage VIN and a counting result CR of the counter 275. The optical coupling circuit 260 converts the voltage setting signal Svs1 into a voltage setting signal Svs2 and transmits the same to the pulse modulation controller 250, where the voltage setting signals Svs1 and Svs2 are substantially the same, though a signal type of the voltage setting signal Svs2 can be determined according to a demand of the pulse modulation controller 250, for example, the pulse modulation controller 250 is a current mode controller, and the voltage setting signal Svs2 can be a current signal, though the invention is not limited thereto. The pulse modulation controller 250 outputs the control signal Sct according to the voltage setting signal Svs2 to control the first power voltage VP1 output by the conversion circuit 230.

Figure 6:
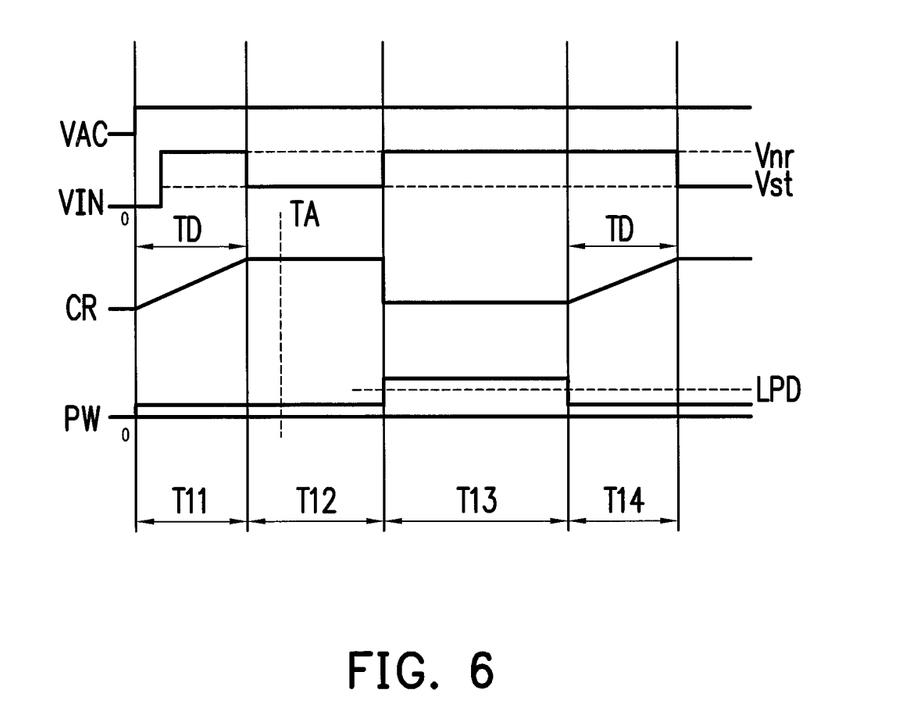
FIG. 6 is a driving waveform diagram of a power supply system according to an embodiment of the invention.

FIG. 6 is a driving waveform diagram of the power supply system 100 according to an embodiment of the invention. In FIG. 6, signal waveforms of the AC voltage VAC provided to the power supply device 200, the input voltage VIN, the power PW of the input voltage VIN and the counting result CR of the counter 275 in the power supply device 200 are displayed. Operation of various components in FIG. 4 and FIG. 5 are described below with reference of FIG. 6.

Referring to FIGS. 4-6, during a period T11, the power supply device 200 receives the AC voltage VAC to provide the input voltage VIN, and controls the input voltage VIN to a standard voltage Vnr (for example, 19V). Now, the power detector 265 detects that the power PW of the input voltage VIN is within a predetermined range (i.e. between 0 and a power detection level LPD), and controls the counter 275 to count a predetermined time period TD, and within the predetermined time period TD, the voltage level of the input voltage VIN is maintained to the standard voltage Vnr. The predetermined time period TD can be set according to an actual circuit requirement, which is not limited by the invention.

During a period T12, the counter 275 has counted to the predetermined time period TD, so that the counting result CR of the counter 275 is maintained, and the power supply device 200 outputs the input voltage VIN with a standby voltage Vst (for example, 5V). Here, it is assumed that the electronic apparatus 120b is electrically connected to the power supply device 200 at a time point TA, the voltage detector 125 in the electronic apparatus 120b detects the input voltage VIN, and accordingly controls the first trigger circuit 190a to enable the trigger signal S21 for outputting to the reset pin REST of the logic circuit 160 to turn on the switch unit 150. Therefore, the input voltage VIN is provided to the electronic apparatus 120b to activate the controller 130 in the electronic apparatus 120b to perform corresponding operations. However, the system of the electronic apparatus 120b is now assumed to be shutdown or in the hibernation state, i.e. the virtual load 115 is not activated, the power detector 265 detects that the power PW of the input voltage VIN is lower than the power detection level LPD, and maintains the voltage level of the input voltage VIN to the standby voltage Vst.

During a period T13, it is assumed that the second trigger circuit 190b of the electronic apparatus 120b detects the situation that the battery 170 is reinstalled to the electronic apparatus 120b, or the situation that the electronic apparatus 120b is activated (for example, a power button is pressed), the second trigger circuit 190b activates the virtual load 115, and the power PW of the input voltage VIN exceeds the power detection level LPD. Now, the power detector 265 in the power supply device 200 controls the counter 275 to reset the counting result CR, and the power supply device 200 adjusts the input voltage VIN to the standard voltage Vnr.

During a period T14, it is assumed that the electronic apparatus 120b is again shut down, and the first trigger circuit 190a turns off the virtual load 115, so that the power PW of the input voltage VIN returns back to the predetermined range (i.e. between 0 and the power detection level LPD). Now, the power detector 265 controls the counter 275 to count the predetermined time period TD, and within the predetermined time period TD, the voltage level of the input voltage is still maintained to the standard voltage Vnr.

After the period T14, the counter 275 has counted to the predetermined time period TD, so that the counting result CR of the counter 275 is maintained, and the power supply device 200 outputs the input voltage VIN with the standby voltage Vst. Since now the electronic apparatus 120b is shut down, i.e. the power PW of the input voltage VIN does not exceed the power detection level LPD, the voltage level of the input voltage VIN is maintained to the standby voltage Vst.

In summary, when the electronic apparatus of the invention enters the power saving state (for example, the standby mode or the shutdown state), the switch unit can be turned off through the passive logic circuit, such that the external power is stopped to be supplied to the electronic apparatus, and the logic circuit can replace the controller to monitor the state of the electronic apparatus. In this way, the controller of the electronic apparatus can enter the standby state or can be turned off to decrease unnecessary power consumption. Moreover, when the state of the electronic apparatus is changed, the logic circuit can immediately activate the switch unit to restore power supply and activate the controller. Therefore, the controller is unnecessary to be permanently actuated, so that a green power effect is achieved without influencing the functions of the electronic apparatus.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic apparatus, comprising:
    a controller, providing a setting signal;
    a first trigger circuit, providing a trigger signal according to at least one first trigger situation;
    a switch unit, connected to a power input terminal of the electronic apparatus; and
    a logic circuit, coupled to the controller, the first trigger circuit and the switch unit, and adjusting a switching signal according to the setting signal and the trigger signal,
    wherein the switch unit decides whether to provide an input voltage at the power input terminal to the electronic apparatus according to the switching signal.

2. The electronic apparatus as claimed in claim 1, wherein when the electronic apparatus enters a power saving state, the controller enables the setting signal, the logic circuit enables the switching signal according to the setting signal, and the switch unit stops providing the input voltage to the electronic apparatus according to the enabled switching signal.

3. The electronic apparatus as claimed in claim 2, wherein the power saving state comprises a state of system hibernation or shutdown in case that the power input terminal receives the input voltage, a state that a battery installed in the electronic apparatus is fully charged or the electronic apparatus doe not have the battery, and a state that all functions related to the system hibernation or shutdown are disabled.

4. The electronic apparatus as claimed in claim 1, wherein when the at least one first trigger situation is occurred, the first trigger circuit enables the trigger signal, the logic circuit disables the switching signal according to the trigger signal, and the switch unit provides the input voltage to the electronic apparatus according to the disabled switching signal.

5. The electronic apparatus as claimed in claim 4, wherein the at least one first trigger situation comprises: a situation that a battery is reinstalled to the electronic apparatus, a situation that the electronic apparatus is activated, or a situation that the electronic apparatus re-receives the input voltage.

6. The electronic apparatus as claimed in claim 1, wherein when the logic circuit does not receive the enabled setting signal or the enabled trigger signal, the logic circuit makes the switch unit to maintain an original state.

7. The electronic apparatus as claimed in claim 1, wherein the first trigger circuit comprises:
    a one shot circuit, coupled to the logic circuit, wherein the one shot circuit provides the enabled trigger signal to the logic circuit when the at least one first trigger situation is occurred.

8. The electronic apparatus as claimed in claim 1, wherein the logic circuit comprises:
    a first NOR gate, having a first input terminal coupled to the setting signal, and a second input terminal coupled to the switching signal; and
    a second NOR gate, having a first input terminal coupled to the trigger signal, a second input terminal coupled to an output terminal of the first NOR gate, and an output terminal providing the switching signal.

9. The electronic apparatus as claimed in claim 1, further comprising:
    a power conversion circuit, coupled to the switch unit and the controller, wherein the power conversion circuit converts the input voltage into a driving voltage to drive the controller.

10. The electronic apparatus as claimed in claim 9, wherein the power conversion circuit is further coupled to the power input terminal and the logic circuit to convert the input voltage into an auxiliary voltage to drive the logic circuit.

11. The electronic apparatus as claimed in claim 10, wherein the switch unit comprises a back-to-back switch, and the electronic apparatus further comprises:
    an adjustment circuit, coupled between the switch unit and the logic circuit, and adjusting a level of the switch signal according to a type of the switch unit for outputting to the switch unit.

12. The electronic apparatus as claimed in claim 11, wherein the switch unit is a set of N-type field effect transistors with sources coupled to each other.

13. The electronic apparatus as claimed in claim 11, wherein the adjustment circuit is further coupled to the auxiliary voltage to adjust a level of the switching signal for outputting to the switch unit.

14. The electronic apparatus as claimed in claim 10, wherein further comprises:
    a switch, having a first terminal coupled to the auxiliary voltage, a second terminal coupled to the controller, and a control terminal coupled to the switching signal.

15. The electronic apparatus as claimed in claim 3, wherein the power saving state further comprises a state when a capacity of the battery is greater than a high threshold, and when the capacity of the battery is smaller than a low threshold, the controller controls the logic circuit to turn on the switch unit, and the switch unit provides the input voltage to the electronic apparatus.

16. The electronic apparatus as claimed in claim 1, further comprising:
    a virtual load, coupled to the power input terminal; and
    a second trigger circuit, coupled to the virtual load, and when at least one second trigger situation of the electronic apparatus is occurred, the second trigger circuit activates the virtual load to adjust an output power output to the electronic apparatus by a power supply device coupled to the electronic apparatus.

17. The electronic apparatus as claimed in claim 16, wherein the at least one second trigger situation comprises a situation that a battery is reinstalled to the electronic apparatus, or a situation that the electronic apparatus is activated.

18. The electronic apparatus as claimed in claim 16, further comprising:

a power detector, coupled to the power input terminal and the first trigger circuit, and when the power detector detects that the input voltage is received, the first trigger circuit outputs the trigger signal to turn on the switch unit.

* * * * *